(12) United States Patent
Huke et al.

(10) Patent No.: US 11,978,309 B2
(45) Date of Patent: *May 7, 2024

(54) LOCATION-BASED USER INTERFACE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,852

(22) Filed: Oct. 24, 2022

(65) Prior Publication Data

US 2023/0037485 A1 Feb. 9, 2023

Related U.S. Application Data

(63) Continuation of application No. 17/537,881, filed on Nov. 30, 2021, now Pat. No. 11,482,072.

(60) Provisional application No. 63/119,819, filed on Dec. 1, 2020.

(51) Int. Cl.
*G07F 17/32* (2006.01)
*G06Q 30/0207* (2023.01)
*G06Q 50/34* (2012.01)

(52) U.S. Cl.
CPC ..... *G07F 17/3239* (2013.01); *G06Q 30/0239* (2013.01); *G06Q 50/34* (2013.01); *G07F 17/3211* (2013.01); *G07F 17/3227* (2013.01); *G07F 17/3288* (2013.01)

(58) Field of Classification Search
CPC ............ G07F 17/3239; G07F 17/3211; G07F 17/3227; G07F 17/3288; G06Q 30/0239; G06Q 50/34
See application file for complete search history.

(56) References Cited

U.S. PATENT DOCUMENTS

| 7,534,169 B2 | 5/2009 | Amaitis et al. |
| 9,881,453 B2 | 1/2018 | Graham et al. |
| 2003/0003997 A1 | 1/2003 | Vuong et al. |
| 2011/0165946 A1 | 7/2011 | Pavlich et al. |
| 2013/0073387 A1 | 3/2013 | Heath |

FOREIGN PATENT DOCUMENTS

AU 2020257125 A1 11/2020

*Primary Examiner* — Kevin Y Kim
(74) *Attorney, Agent, or Firm* — Maier & Maier, PLLC

(57) ABSTRACT

The present invention provides a system for updating a wagering application interface to a customized interface with additional functionality based upon the user's physical location, such as a sports arena or stadium, restaurant, or bar. The updated wagering application interface provides the user with a customized appearance that incorporates the home team's colors if located at a stadium or arena or provides signage or advertisements on the interface if the user is located at a sports bar or restaurant. Also, additional functionality can be provided through the wagering application, such as ordering food or providing promotions being offered at the location to allow the user to enjoy a customized wagering experience through the wagering application interface based on the user's physical location.

16 Claims, 3 Drawing Sheets

Location-based wagering interface system

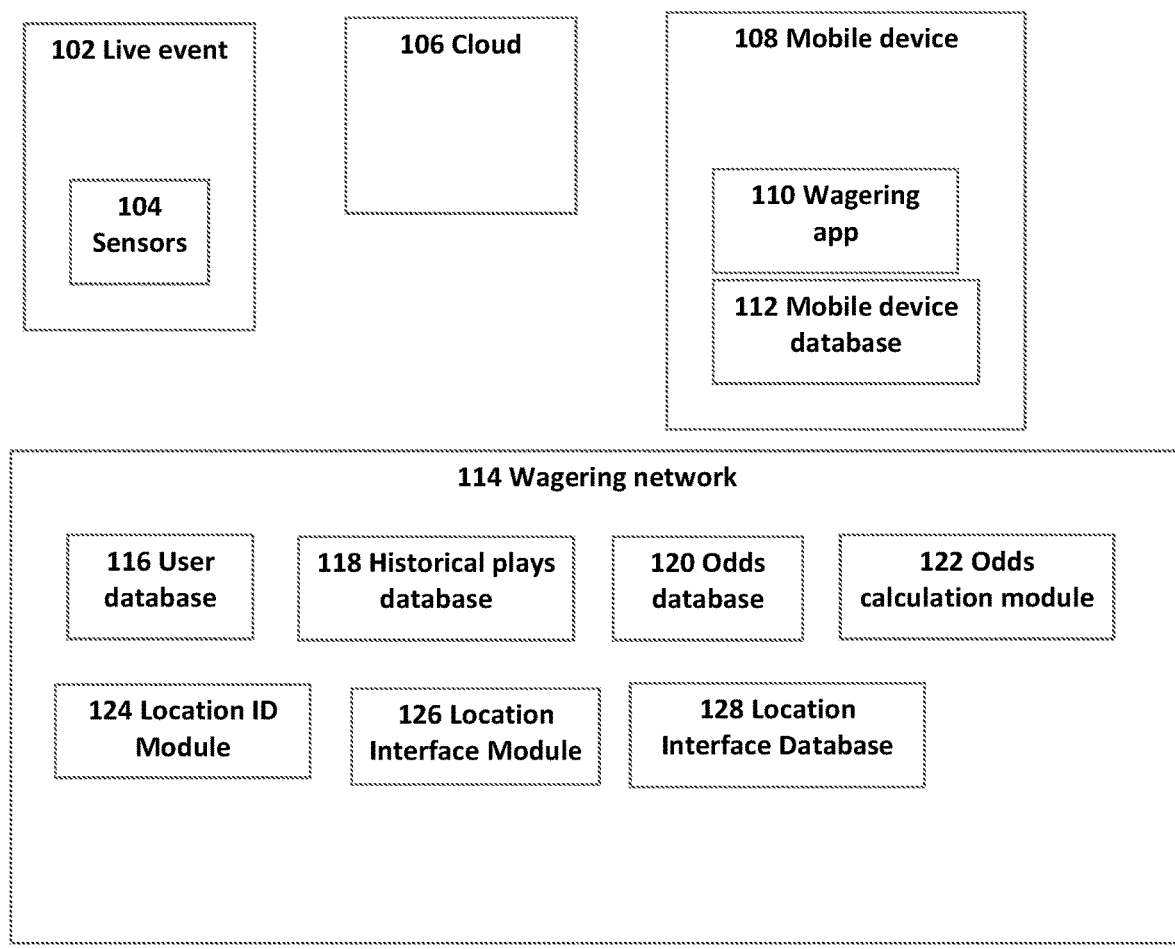
Fig.1 Location-based wagering interface system

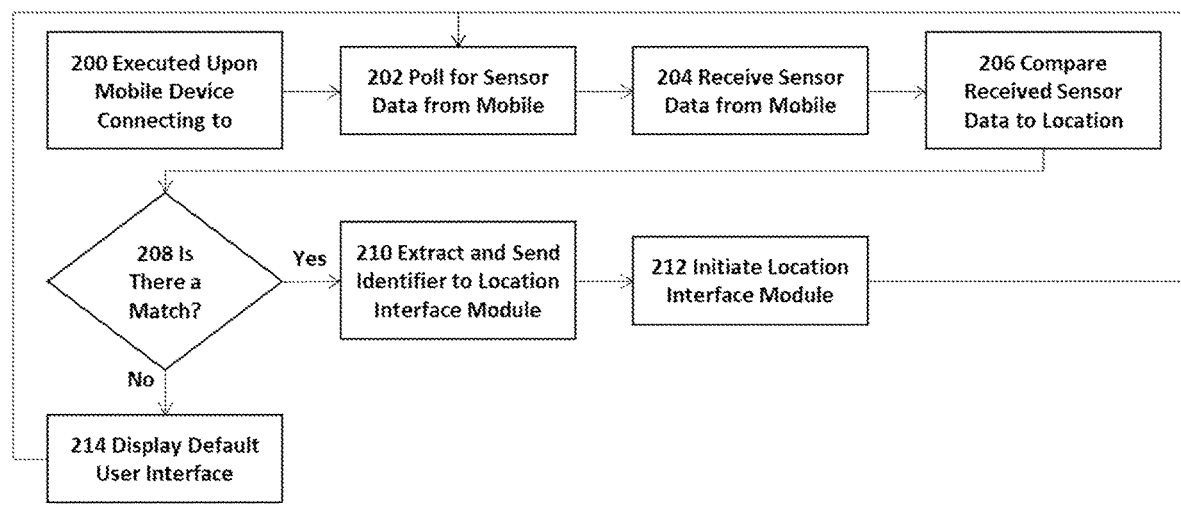
Fig.2 Location ID Module

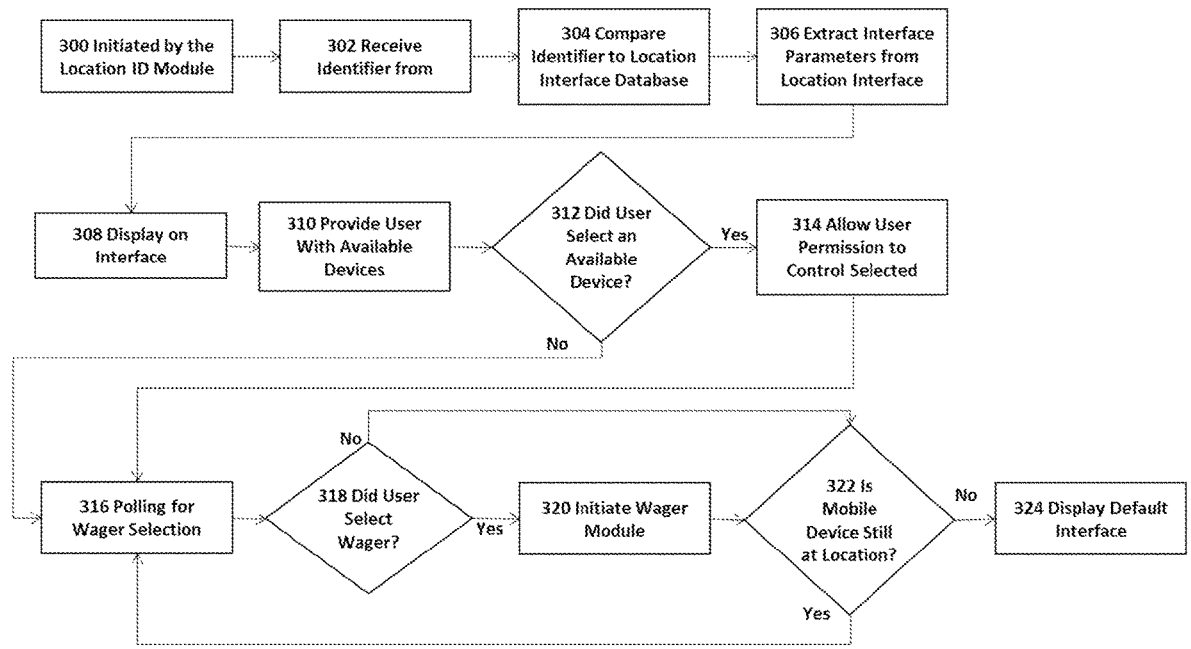

Fig.3 Location Interface Module

| Location | Identifier | Address | GPS Coordinates | Interface Data File | Devices Available |
|---|---|---|---|---|---|
| Fenway Park | #456123 | 4 Jersey St, Boston, MA | 42.34676, -71.09720 | FenwayPark.Data | Tablet |
| TD Garden - Celtics | #654321 | 100 Legends Way, Boston, MA | 42.36632, -71.06214 | BostonCeltics.Data | Tablet |
| TD Garden - Bruins | #654322 | 101 Legends Way, Boston, MA | 42.36632, -71.06214 | BostonBruins.Data | Tablet |
| The Fours Restaurant and Sports Bar | #987123 | 166 Canal St, Boston, MA | 42.36569, -71.06097 | TheFoursBoston.Data | TV, Tablet |
| Bleacher Bar | #123789 | 82A Landsdowne St, Boston, MA | 42.34717, -71.09679 | BleacherBarBoston.Data | TV, Tablet, Gaming Machine |
| - | - | - | - | - | - |
| - | - | - | - | - | - |
| - | - | - | - | - | - |
| - | - | - | - | - | - |

Fig.4 Location Interface Database

LOCATION-BASED USER INTERFACE

CROSS-REFERENCE TO RELATED APPLICATIONS

The present patent application claims benefit and priority to U.S. patent application Ser. No. 17/537,881, filed Nov. 30, 2021 which claims the benefit and priority to U.S. Provisional Patent Application No. 63/119,819 entitled "LOCATION BASED UI SWITCH" filed on Dec. 1, 2020 which is hereby incorporated by reference into the present disclosure.

FIELD

The embodiments are generally related to play-by-play wagering on live sporting events.

BACKGROUND

Currently, an issue with wagering applications is that the user interfaces are identical despite the different locations of the users, leaving the user with the same interface and same functionality despite using the wagering application in different states, cities, arenas, stadiums, restaurants, or bars.

Another issue with wagering applications is that they do not utilize the location data of the user's mobile device besides determining if wagering is allowed in the user's current location.

Lastly, the wagering applications user interface remains static and unchanged despite the environment around the user constantly changing. The limited functionality of the wagering applications prevents various 3rd parties from incorporating additional functions into the wagering application based upon the user's physical location.

SUMMARY

Methods, systems, and apparatuses for a location-based user interface may be provided. In one embodiment, a system for providing a location-based interface on a wagering network can include at least one user device having a display; at least one third party service provider, the at least one third party service provider having a defined location; and a wagering network communicatively coupled to the at least one user device and the at least one third party service provider, wherein the wagering network alters the display on the at least one user device when the at least one user device and the at least one third party service provider are both connected to the wagering network and are in the defined location of the third party service provider.

In another embodiment, a method for providing location-based content on a mobile device can include defining a physical location of a third party service provider; associating a location identifier with the defined location of the third party service provider; associating custom content of the third party service provider with the location identifier; identifying a mobile device that is physically located in the defined location of the third party service provider; communicatively coupling the mobile device to the third party service provider through a wagering network; and displaying the custom content associated with the location identifier on a display of the mobile device.

BRIEF DESCRIPTIONS OF THE DRAWINGS

The accompanying drawings illustrate various embodiments of systems, methods, and various other aspects of the embodiments. Any person having ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a location-based wagering interface system, according to an embodiment.

FIG. 2 illustrates a location ID module, according to an embodiment.

FIG. 3 illustrates a location interface module, according to an embodiment.

FIG. 4 illustrates a location interface database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for a location-based wagering interface. This system may include a live event 102, for example, a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, but not limited to, a straight bet, a money line bet, a bet with a point spread or line that the bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk. This is typically applied to round-robin or other tournaments' styles. There are other types of wagers, including parlays, teasers, and prop bets, that are added games that often allow the user to customize their betting by changing the odds and payouts they receive on a wager. Certain sportsbooks will allow the bettor to buy points, to move the point spread off of the opening line. This will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have several bets they can handle, a limit of wagers they can take on either side of a bet before they will move the line or odds off of the opening line. Additionally, there are circumstances, such as an injury to an important player such as a listed pitcher, in which a sportsbook, casino, or racino will take an available wager off the board. As the line moves, there becomes an opportunity for a bettor to bet on both sides at different points spreads to middle, and win both bets. Sportsbooks will often offer bets on portions of games, such as first-half bets and half-time bets. Additionally, the sportsbook can offer futures bets on live events in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, optical sensors and cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices, etc. Also, the plurality of sensors 104 may include tracking devices, such as RFID tags, GPS chips, or other such devices embedded on uniforms, in equipment, in the field of play, in the boundaries of the field of play, or on other markers on the field of play. Imaging devices may also be used as tracking devices such as player tracking that provides statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques that are known in the art. The communication network may allow ubiquitous access to shared pools of configurable system resources and higher-level services that can be rapidly provisioned with minimal management effort, often over the internet, and relies on sharing of resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data, such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and the data from this feed may be compared with a variety of team data and league data based on a variety of elements, including down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide for voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control the I/O devices. The I/O controller may control one or more I/O devices, such as e.g., a keyboard and a pointing device, e.g., a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, an Ethernet bus, a Gigabit Ethernet bus, a Fiber Channel bus, or a Thunderbolt bus. In some embodiments, the mobile device 108 could be an optional component and would be utilized in a situation where a paired wearable device utilizes the mobile device 108 as additional memory or computing power or connection to the internet.

Further, embodiments may include a wagering software application or a wagering app 110, which is a program that enables the user to place bets on individual plays in the live event 102 and display the audio and video from the live event 102, along with the available wagers on the mobile device 108. The wagering app 110 allows the user to interact with the wagering network 114 to place bets and provide payment/receive funds based on wager outcomes.

Further, embodiments may include a mobile device database 112 that may store some or all of the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network 114 can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a user database 116, which may contain data relevant to all users of the wagering network 114 and may include, a user ID, a device identifier, a paired device identifier, wagering history, and wallet information for the user. The user database 116 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 116 may contain betting lines and search queries. The user database 116 may be searched based on a search criterion received from the user. Each betting line may include a plurality of betting attributes such as at least one of the live event 102, a team, a player, an amount of wager, etc. The user database 116 may include information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical play database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120 that contains the odds calculated by an odds calculation module 122 to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a location ID module 124, which is executed from the wagering network base module (not shown) when the mobile device 108 is connected to the wagering network 114. The location ID module 124 then polls for sensor data from the various sensors located on the mobile device 108. For example, the mobile device 108 location may be obtained through GPS data, Wi-Fi data, microphone data, and/or camera data recognizing location-based indicators. The location ID module 124 then receives the sensor data from the mobile device 108 and compares this data to a location interface database 128. If it is determined that there is a match between the received sensor data from the mobile device 108 and the data stored in the location interface database 128, the location ID module 124 extracts the location identifier, sends the location identifier to a location interface module 126 and initiates the location interface module 126. If it is determined that there is no match between the received sensor data from the mobile device 108 and the data stored in the location interface database 128, then the default user interface is used on the mobile device 108.

Further, embodiments may include the location interface module 126, which is initiated by the location ID module 124 when a location identifier is detected. The location interface module 126 receives the location identifier from the location ID module 124 and extracts parameters from the location interface database 128. The parameters extracted are then displayed on the mobile device 108 user interface, which allows the wagering app 110 to have a customized interface based on the mobile device 108 location. The location interface module 124 provides a list of available devices that the user may take control of through their mobile device 108, and the user may or may not select one of the available devices to take control of. Then the location interface module 126 is continuously polling for the user to select a wager. If it is determined that the user selected a wager, then the wager module (not shown) is initiated. If it is determined that the user did not select a wager, or after the location interface module 126 initiates the wager module (not shown), the location interface module 126 determines if the mobile device 108 is still at the location. If it is determined that the mobile device 108 is still located at the same location, then the process returns to polling for a wager selection by the user; however, it if is determined that the mobile device 108 is no longer at the location, the location interface module 126 displays the default user interface on the wagering app 110.

Further, embodiments may include the location interface database 128, which stores the location-specific interfaces and the corresponding settings used by the location ID module 124 to determine a location of a mobile device 108, and by the location interface module 126 to extract the interface parameters through a data file stored in the location interface database 128 to display an interface customized for the location on the mobile device 108 interface. The location interface database 128 may contain the location, such as a sports stadium, restaurant, or bar, an identifier, such as a unique combination of numbers, letters, or characters that may be used to identify a specific location, the address of the location, the GPS coordinates of the location, an interface data file which contains the unique interface to the location, and a list of available devices that the user may control through the mobile device 108 such as televisions, tablets, or gaming machines. In some embodiments, the location interface database 128 may contain additional features or functions specific to the location, for example, ordering food or beverages through the interface, providing images specific to the location, offering promotions or coupons specific to the location, etc.

FIG. 2 illustrates the location ID module 124. The process begins with the location ID module 124 being executed, at step 200, upon the mobile device 108 connecting to the wagering network 114. For example, a user activates the wagering app 110 on the mobile device 108, and the mobile device 108 connects to the wagering network 114, which executes the location ID module 124 to determine the user's location. The location ID module 124 is continuously polling, at step 202, for the sensor data from the mobile device 108, for example, the location ID module 124 is polling for sensor data, such as GPS data from the mobile device 108, the Wi-Fi the mobile device 108 is currently connected to, an image from the mobile device 108 such as an image inside a stadium or arena, recorded microphone data from the mobile device 108, such as an announcement or broadcast through the public announcements in a stadium or arena, or geofence location data, to determine the physical location of the mobile device 108. Then the location ID module 124 receives, at step 204, the sensor data from the mobile device 108, for example, the location ID module 124 is polling for sensor data, such as GPS data from the mobile device 108, the Wi-Fi the mobile device 108 is currently connected to, an image from the mobile device 108 such as an image inside a stadium or arena, recorded microphone data from the mobile device 108, such as an announcement or broadcast through the public announcements in a stadium or arena, or geofence location data, to determine the physical location of the mobile device 108. The location ID module 124 then compares, at step 206, the received sensor data to the location interface database 128. For example, if the received sensor data is GPS coordinates from the mobile device, the location ID module 124 compares the received GPS coordinates to the GPS coordinates stored in the location interface database 128 to determine if there is a match. In some embodiments, the received sensor data may be a Wi-Fi connection or name, an image from inside a stadium, arena, restaurant, or bar, a sound clip or audio recording captured by the microphone in the mobile device 108 of a broadcast within an arena or stadium, etc. For example, if a user is located at Fenway Park in Boston, MA, the mobile device 108 may send GPS coordinates, such as 42.34676, −71.09720, to the location ID module 124, which is then compared to the GPS coordinates stored in the location interface database 128. The location ID module 124 determines, at step 208, if there is a match between the received sensor data and the data stored in the location interface database 128. For example, if the received GPS coordinates from the mobile device 108 are 42.34676, −71.09720 and these coordinates are stored in the location interface database 128, then the wagering network 114 knows that the user is located at Fenway Park in Boston, MA. If it is determined that there is a match between the received sensor data and the data stored in the location interface database 128, the location ID module 124 extracts and sends, at step 210, the identifier stored in the location interface database 128 to the location interface module 126. For example, if the match determines the user is located at Fenway Park in Boston, MA, the identifier associated with Fenway Park may be #456123, extracted from the location interface database 128 sent to the location interface module 126. Then the location ID module 124 initiates, at step 212, the location interface module 126. If it is determined that there is no match between the received sensor data from the mobile device 108 and the data stored in the location interface database 128, then the location ID module 124 displays, at step 214, the default user interface for the wagering app 110 on the user's mobile device 108.

FIG. 3 illustrates the location interface module 126. The process begins with the location interface module 126 being initiated, at step 300, by the location ID module 124. For example, if it is determined that there is a match between the received sensor data from the mobile device 108 and the location interface database 128, the location ID module 124 initiates the location interface module 126. Then the location interface module 126 receives, at step 302, the identifier from the location ID module 124. For example, if it was determined there was a match between the received sensor data from the mobile device 108 and the location interface database 128, the location ID module 126 extracts the associated identifier with that location. If it is determined that the mobile device 108 is located at Fenway Park in Boston, MA, the associated identifier of #456123 is extracted from the location interface database 128 and is sent by the location ID module 124 and received by the location interface module 126. The location interface module 126 compares, at step 304, the received identifier to the location interface database 128 to find the associated data stored with the identifier. For example, suppose the received identifier is #456123. In that case, the associated data with that identifier may be the location, such as Fenway Park, the address such as 4 Jersey St., Boston, MA, and the interface data file, which contains the customized interface for the wagering app 110 that provides the user with a unique experience through a customized interface based upon their location. Then the location interface module 126 extracts, at step 306, the interface parameters from the location interface database 128 associated with the received identifier. For example, if the received identifier is #456123, the associated interface parameters are stored in the data file FenwayPark-.Data, which provides the user with a unique experience through the wagering app 110 through a customized interface based upon their location. In this example, the wagering app 110 may have an interface with the Boston Red Sox team colors and may connect the wagering app 110 to a 3rd party network that allows the user to order food and beverages through the wagering app 110. Then the location interface module 126 displays, at step 308, the interface on the wagering app 110. For example, if the received identifier is #456123, the associated interface parameters are stored in the data file FenwayPark.Data, which provides the user with a unique experience through the wagering app 110 through a customized interface based upon their location. In this example, the wagering app 110 may have an interface with the Boston Red Sox team colors and may connect the wagering app 110 to a 3rd party network that allows the user to order food and beverages through the wagering app 110. The location interface module 126 provides, at step 310, the user with a list of available devices. For example, the available devices are extracted from the location interface database 128, which allows a user to connect the mobile device 108 to the available device and take control of the device from their mobile device 108, such as a television in a restaurant, a tablet in which food and beverages may be ordered through at a stadium or arena, or a gaming machine at a bar such as a state-run lottery game, for example, Keno, All or Nothing, Powerball, Mega Millions, or a sports wagering machine, etc. to allow the user to place wagers, purchase tickets through their mobile device 108 on the gaming machine. The location interface module 126 determines, at step 312, if the user selected an available device to control. For example, the location interface module 126 provides a list of available devices, such as televisions, tablets, gaming machines, etc., to the user within the stadium, arena, restaurant, or bar for the user to control, and the user may select one of the available devices to control. In some embodiments, the available devices to the user may depend on the location of the mobile device within the stadium, arena, restaurant, or bar so that the devices located nearest to the mobile device 108 may appear at the top of the list of available devices. In some embodiments, the user may control the device through a Bluetooth connection, Wi-Fi connection, or the cloud 106, providing the user the ability to control the device through the mobile device 108. In some embodiments, the user may have control of various functions of the device. For example, the user may control the channels, volume, etc., on a television, the ability to order food, beverages, pay a bill, etc., through a tablet, place wagers, or purchase tickets for gaming machines. If it is determined that the user selected an available device, the location interface module 126 allows, at step 314, permission to the user to control the device. For example, the user may have control of various functions of the device. For example, the user may control the channels, volume, etc., on a television, the ability to order food, beverages, pay a bill, etc., through a tablet, place wagers, or purchase tickets for gaming machines. If it is determined that the user did not select an available device to control or after the user has selected an available device to control, the location interface module 126 continuously polls, at step 316, for a wager selection from the user. The new interface provides the same wagering functionality provided by the wagering app 110, and the location interface module 126 is waiting for the user to select a wager. The location interface module 126 determines, at step 318, if the user selected a wager through the wagering app 110. If it is determined that the user has selected a wager, then the location interface module 126 initiates, at step 320, the wagering module, which allows the user to place their wager through the wagering network 114. If it is determined that the user did not select a wager, then it is determined, at step 322, if the mobile device is still at the location. If it is determined that the user is still at the location, then the process returns to step 316. In some embodiments, if the user does not select a wager in a predetermined amount of time, for example, 5 minutes, then the process returns to the location ID module 124 to determine the location of the mobile device 108 by receiving the sensor data and comparing the data to the location interface database 128 to find a match, extracts the identifier and sends the identifier to the location interface module 126 to ensure that the user's mobile device 108 is still located at the same location. If it is determined that the user's mobile device 108 is no longer at the location, then the location interface module 126 displays, at step 324, the default interface of the wagering app 110. In some embodiments, if the user does not select a wager in a predetermined amount of time, for example, 5 minutes, then the process returns to the location ID module 124 to determine the location of the mobile device 108 by receiving the sensor data and comparing the data to the location interface database 128. If a match between the received sensor data and the location interface database 128 is not found, the location ID module 124 displays the default interface of the wagering app 110 and disconnects the user's mobile device 108 from any devices within the arena, stadium, restaurant, or bar that they may have previously connected to.

FIG. 4 illustrates the location interface database 128, which stores the location-specific interfaces and the corresponding settings used by the location ID module 124 to determine the location of the mobile device 108, and uses the location interface module 126 to extract the interface parameters through a data file stored in the location interface database 128 to display an interface customized for the location on the mobile device 108. The location interface database 128 may contain the location, such as a sports stadium, restaurant, or bar, an identifier, such as a unique combination of numbers, letters, or characters that are used to identify a specific location, the address of the location, the GPS coordinates or geofence location data of the location, and an interface data file which contains the unique interface to the location. In some embodiments, the location interface database 128 may contain additional features or functions specific to the location, for example, ordering food or beverages through the interface, providing images specific to the location, offering promotions or coupons specific to the location, etc. The data file may be unique to each individual location to provide the user with an interface that is based on the home team colors, include logos, etc. and for restaurants and bars, provide the locations colors, branding, logos, advertisements, promotions such as two-dollar beers or fifty percent off appetizers. In some embodiments, the data file may provide the wagering app 110 with access to a 3rd party device, server, or service, receive food and beverage menus, and allow the user through the wagering app 110 to send in food and beverage orders to the 3rd party.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system configured to provide a location-based interface on a wagering network, comprising:
at least one user device having a display, the at least one user device configured to execute a wagering app connected with the wagering network; and
at least one third party service provider having a defined location, wherein the wagering network is communicatively coupled to the at least one user device and the at least one third party service provider, the wagering app comprises a graphical user interface configured to be displayed according to a default visual theme, the wagering network is configured to cause the wagering app to display a customized visual theme on the at least one user device at the defined location when both the at least one user device and the at least one third party service provider are connected to the wagering network.

2. The system of claim 1, wherein at least one sensor of the at least one user device is configured to determine whether the at least one user device is at the defined location.

3. The system of claim 2, wherein the at least one sensor comprises a GPS unit of at least one mobile device, and the defined location is determined according to GPS data provided by the GPS unit.

4. The system of claim 2, wherein the at least one sensor comprises a camera of at least one mobile device, and the defined location is determined based on an image recorded by the camera.

5. The system of claim 2, wherein the at least one sensor comprises a microphone of at least one mobile device, and the defined location is determined based on an audio signal recorded by the microphone.

6. The system of claim 1, further comprising:
at least one non-user device, wherein the at least one non-user device is configured to be controlled by the at least one user device when the at least one user device and the at least one third party service provider are simultaneously coupled to the wagering network in the defined location.

7. The system of claim 1, wherein the customized visual theme comprises at least one of branding corresponding to the defined location and team colors corresponding to the defined location.

8. The system of claim 1, wherein the customized visual theme comprises at least one of promotional materials corresponding to the defined location and advertisements corresponding to the defined location.

9. A method for providing location-based content on a mobile device, comprising:
establishing a defined location of a third party service provider;
associating a customized visual theme with the defined location;
identifying a mobile device at the defined location of the third party service provider which is running a wagering app on a display of the mobile device;
communicatively coupling the mobile device to the third party service provider through a wagering network; and
displaying a customized visual theme unique to the defined location on the display of the mobile device.

10. The method of claim 9, further comprising:
determining the defined location based on at least one sensor of the mobile device.

11. The method of claim 10, further comprising:
determining the defined location based on a GPS unit of the mobile device.

12. The method of claim 10, further comprising:
determining the defined location based on a camera of the mobile device.

13. The method of claim 10, further comprising:
determining the defined location based on a microphone of the mobile device.

14. The method of claim 9, wherein the customized visual theme comprises at least one of branding corresponding to the defined location and team colors corresponding to the defined location.

15. The method of claim 9, further comprising:
obtaining, with the mobile device, a list of non-user devices associated with the defined location; and
communicatively coupling the mobile device to at least one of the non-user devices associated with the defined location.

16. The method of claim 9, wherein the customized visual theme comprises at least one of promotional materials corresponding to the defined location and advertisements corresponding to the defined location.

\* \* \* \* \*